United States Patent [19]

Conrad et al.

[11] 4,347,428
[45] Aug. 31, 1982

[54] HANDLE AND SUPPORTING STRUCTURE FOR AN ELECTRIC PRESSING IRON HAVING ELECTRONIC TEMPERATURE CONTROL

[75] Inventors: Rainer Conrad, Hanau; Hubert Seifert, Heusenstamm, both of Fed. Rep. of Germany

[73] Assignee: Rowenta-Werke GmbH, Offenbach am Main, Fed. Rep. of Germany

[21] Appl. No.: 178,407

[22] Filed: Aug. 15, 1980

[30] Foreign Application Priority Data

Aug. 27, 1979 [DE] Fed. Rep. of Germany ....... 2934520
Aug. 27, 1979 [DE] Fed. Rep. of Germany ... 7924294[U]

[51] Int. Cl.³ ...................... H05B 1/02; D06F 75/26; D06F 75/34
[52] U.S. Cl. ...................................... 219/251; 38/82; 38/88; 38/90; 174/46; 174/135; 219/241; 219/242; 219/259; 219/497; 219/501; 219/506; 219/533
[58] Field of Search ............................... 219/245–259, 219/241, 242, 533, 501, 496–498, 506; 38/74–92; 174/135, 46

[56] References Cited

U.S. PATENT DOCUMENTS 2,829,232 4/1958 Negromamti .......................... 38/82
3,732,394 5/1973 Cusworth ............................. 219/251

FOREIGN PATENT DOCUMENTS 1968629 9/1967 Fed. Rep. of Germany .
1972915 11/1967 Fed. Rep. of Germany .
2107924 9/1971 Fed. Rep. of Germany .
2156007 5/1972 Fed. Rep. of Germany .
7609526 8/1976 Fed. Rep. of Germany .
7924293 8/1979 Fed. Rep. of Germany .
7924294 8/1979 Fed. Rep. of Germany .
1159510 2/1958 France ............................... 38/77.7
2414577 1/1981 France .
254220 12/1948 Switzerland ....................... 219/256
396245 1/1966 Switzerland ....................... 219/251
622681 5/1949 United Kingdom ............... 219/252
1068419 5/1967 United Kingdom ............... 219/251

Primary Examiner—A. Bartis
Attorney, Agent, or Firm—George R. Clark; Neil M. Rose; Allen J. Hoover

[57] ABSTRACT

An electronic temperature control circuit for regulating the soleplate temperature of an electrically heated pressing iron is located in the handle and supporting structure of the iron. The electronic circuit includes a thyristor controlling energization of the soleplate heater and tending to emit heat. The thyristor is mounted to a heat dissipating cooling plate located within a leakproof cavity in the supporting structure remotely from the other electronic components of the control circuit tending to be adversely affected by heat. The cooling plate and thyristor are mounted on a detachable wall closing the cavity and shaped to provide a resting stand which allows the iron to be rested flatly on a horizontal surface without the soleplate contacting the surface.

6 Claims, 5 Drawing Figures

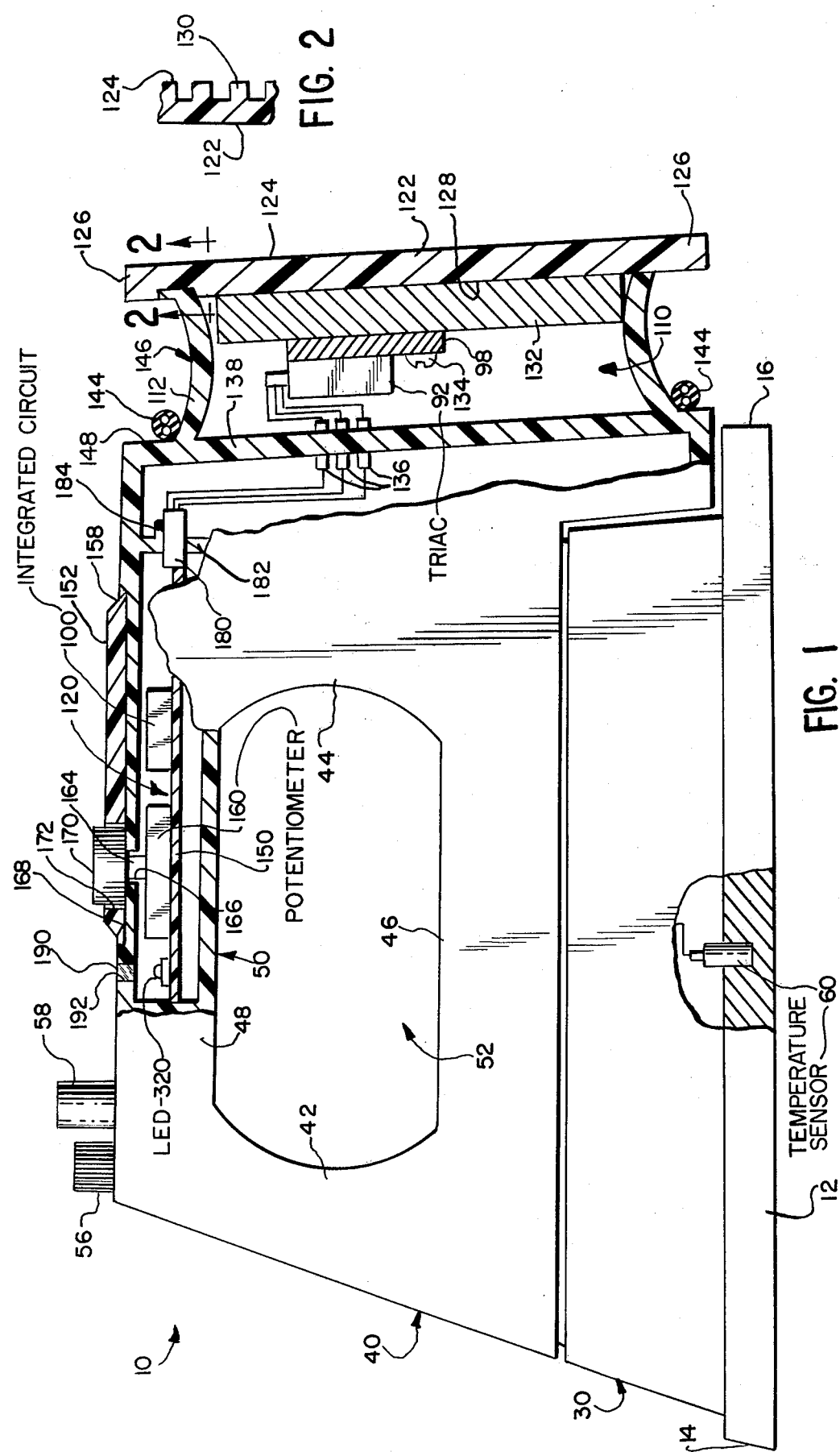

HANDLE AND SUPPORTING STRUCTURE FOR AN ELECTRIC PRESSING IRON HAVING ELECTRONIC TEMPERATURE CONTROL

BACKGROUND OF THE INVENTION

This invention pertains to an improvement in a pressing iron comprising a soleplate, an electric heater, which is arranged to heat the soleplate, and an electronic control, which includes a thyristor controlling energization of the electric heater and tending to emit heat, other electronic components tending to be affected adversely by heat, and a cooling plate being mounted to dissipate heat from the thyristor, which may be a triac.

As exemplified in Gebrauchsmuster 1,972,915 of the Federal Republic of Germany, it is known in a pressing iron for a controlling element, which may be a triac, and other electronic components of an electronic control to be mounted on plates within an elongated chamber, which is insulated thermally from a soleplate, which is ventilated preferably, which is formed in a hollow handle, and which is disposed so as to extend upwardly above a rear portion of the soleplate in normal operating position of the pressing iron. Similarly, it is known for an adjusting element to have an adjusting stem, which extends operatively through an aperture in a rear wall of the handle, and which carries an adjusting knob having a setting indicator. One disadvantage of such an iron is that the elongated chamber entails special tooling costs in production of the handle.

Another disadvantage is that a triac or other controlling element conducting substantial amounts of current emits substantial amounts of heat near other electronic components, which are affected adversely by heat. If the triac or other controlling element is mounted to a cooling plate, heat radiating from the cooling plate has an adverse effect on such electronic components.

Accordingly, there has been a need, to which this invention is addressed, for a pressing iron having an electronic control to be designed so that heat emitted from a triac or other controlling element conducting substantial amount of current would not have an adverse effect on such controlling element, or on other electronic components, and would not present a risk of burns to a user, or to an ironing surface.

SUMMARY OF THE INVENTION

This invention may be embodied in a pressing iron comprising a soleplate, an electric heater, which is mounted so as to heat the soleplate when the electric heater is energized, a supporting structure, which is mounted to the soleplate, a handle, which is supported by the supporting structure, and which is spaced from the soleplate and the electric heater, and an electronic control, which includes a thyristor controlling energization of the electric heater and tending to emit heat, other electronic components tending to be affected adversely by heat, and a cooling plate being mounted to the thyristor so as to dissipate heat from the thyristor.

This invention provides an improvement wherein the supporting structure has a leakproof cavity containing the thyristor and the cooling plate but not the electronic components tending to be affected adversely by heat, and wherein the electronic components tending to be affected adversely by heat are located outside the leakproof cavity, so as to be remote from the thyristor and the cooling plate, as well as from the the soleplate and the electric heater.

Preferably, the cooling plate is mounted to a detachable wall of the supporting structure, the detachable wall is shaped so as to provide a resting stand, which allows the pressing iron to be rested flatly upon a horizontal surface without contact between the soleplate and the horizontal surface, and a metal plate, which is larger than the cooling plate, is mounted between the cooling plate and the detachable wall so as to dissipate heat from the cooling plate, and so as to reduce risk of scorching of the horizontal surface by heat emitted from the thyristor.

The metal body may be mounted to an inner surface of the detachable wall. The pressing iron can be rested on an outer surface of the detachable wall. The outer surface may be larger than the inner surface and may be contoured so as to provide parallel cooling ribs. The supporting structure may be shaped so as to provide a storage reel, around which an electric cord can be wound, and within which the leakproof cavity may be located. The handle may have a leakproof cavity containing the electronic components tending to be affected adversely by heat.

These and other objects, features, and advantages of this invention will be evident from the following description of a preferred embodiment of this invention with reference to drawings.

BRIEF DESCRIPTION OF THE DRAWINGS

FIG. 1 is a lateral, elevational view of a pressing iron, which constitutes a preferred embodiment of this invention. FIG. 1 is broken away, at several places, so as to show internal details of the pressing iron.

FIG. 2 is a fragmentary, sectional view, which is taken along line 2—2 of FIG. 1, in a direction indicated by arrows.

DETAILED DESCRIPTION OF THE PREFERRED EMBODIMENT

Figure 4:
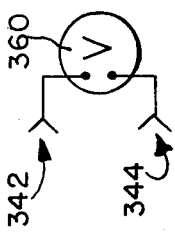
FIG. 4 and FIG. 5, respectively, are fragmentary diagrams of possible modifications of such circuits.

As shown in FIG. 1, a pressing iron 10 has certain known features, which are found in prior electric, steam-generating, pressing irons, and certain novel features. Herein, directional references ("front", "rear", "upper", "lower", and words of analogous import) refer to the pressing iron 10 in its operating position, in which the pressing iron 10 is shown in FIG. 1, and in which the pressing iron 10 may be used for ironing on a horizontal surface.

Among the known features, the pressing iron 10 comprises a soleplate 12, which may be made of cast aluminum, which has a front, pointed end 14, a rear, widened end 16, and multiple holes (not shown) allowing steam to be ejected downwardly from the soleplate 12, and an electric heater 20, and which is arranged to heat the soleplate 12 when the electrical heater 20 is energized. The electric heater 20 is shown diagrammatically in FIG. 3. Among the known features, the pressing iron 10 also comprises a steam generator (not shown) being mounted over the soleplate 12 and including a reservoir (not shown) for water to be vaporized into steam when heated by the electric heater 20 and to be sprayed from a front nozzle (not shown) when desired. Also, a metal shroud 30 is mounted to the soleplate 12 in a conventional manner, so as to cover the steam generator, and an upper shell 40, which may be made of a suitable, heat-resistant, molded plastic material used to make the upper shells of prior pressing irons, but which has certain novel features, is mounted over the metal shroud 30 and to the soleplate 12 in a conventional manner. The plastic material may be polycarbonate.

The upper shell 40 includes front supporting structure 42, which extends upwardly, rear supporting structure 44, which also extends upwardly, a lower covering structure 46, which covers the steam generator, and which is supported by and extends between the supporting structure 42 and the supporting structure 44, and an upper gripping structure 48, which connects the supporting structure 42 and the supporting structure 44, and which constitutes a handle 50 for the pressing iron 10. The handle 50 is spaced from the lower structure 46, the steam generator, the electric heater 20, and the soleplate 12, by an elongated transverse slot 52 accommodating a user's fingers.

Among the known features, the pressing iron 10 also comprises a knob 56, which is mounted operatively on the upper shell 40, and which may be rotated selectively (clockwise or counterclockwise) by a user so as to adjust the pressing iron 10 through known mechanism (not shown) for use selectively with or without emission of steam through the holes in the soleplate 12, whereby the pressing iron 10 may be used selectively as a steam iron or as a dry iron. Among the known features, the pressing iron 10 also comprises a pushbutton 58, which is mounted operatively on the upper shell 40 and behind the knob 56, which is biased to an outward position, and which may be depressed manually, so as to actuate known mechanism (not shown) to spray water from the front nozzle.

A sensor 60 is arranged in a conventional manner to sense a temperature of the soleplate 12. As discussed hereinafter, the sensor 60 may be a thermistor having a positive temperature coefficient of resistance, a thermistor having a negative temperature coefficient of resistance, or a thermocouple.

The pressing iron 10 comprises an electronic control 90, which includes the sensor 60, a triac 92 having a gate 94, controlling energization of the electric heater 20, and tending to emit heat in substantial amounts, other electronic components 96 controlling conduction of the triac 92, as a function of the temperature sensed by the sensor 60, and tending to be affected adversely by heat, and a cooling plate 98 being mounted to dissipate heat from the triac 92. The electronic components 96 include an integrated circuit 100 tending to be affected adversely by heat. The triac 92 is a bidirectional thyristor.

Among the novel features, a leakproof cavity 110 containing the triac 92 and the cooling plate 98 is formed in a rearwardly extending portion 112 of the rear supporting structure 44, and a leakproof cavity 120 containing the electronic components 96 of the electronic control 90 (but not the sensor 60 or the triac 92) is formed in the upper gripping structure 48, which constitutes the handle 50. Thus, the electronic components 96 tending to be affected adversely by heat are located outside the leakproof cavity 110, so as to be remote from the triac 92 and the cooling plate 98, as well as from the soleplate 12 and the electric heater 20.

As shown, the leakproof cavity 110 is closed by a detachable wall 122, which is shaped so as to provide a resting stand, so as to allow the pressing iron 10 to be rested flatly on an outer surface 124 of the detachable wall 122, upon a horizontal surface, without contact between the soleplate 12 and the horizontal surface. Outer marginal portions 126 of the detachable wall 122 extend laterally beyond the rearwardly extending portion 112 of the rear supporting structure 44. The outer surface 124 of the detachable wall 122 is contoured or cross-hatched, so as to be larger in surface area than its inner surface 128 facing the leakproof cavity 110, for enhanced dispersion of heat. As shown in FIG. 2, the outer surface 124 is provided with parallel cooling ribs 130, for a sort of chimney effect promoting the dispersion of heat.

A metal plate 132, which is larger than the cooling plate 98, is mounted between the cooling plate 98 and the detachable wall 122, by a screw 134, so as to dissipate heat from the cooling plate 98, and so as to reduce risk of scorching of the horizontal surface by heat emitted by the triac 92. Additional screws or other fasteners (not shown) of conventional types mount the metal plate 132 to the detachable wall 122 and the detachable wall 122 to the rear supporting structure 44. Electrical connections are made to the triac 92 through pin connectors 136, which pass through a fixed wall 138 of the rear supporting structure 44 in a conventional manner, and which can be pulled open, as for disconnection of the triac 92, after the detachable wall 122 has been detached, and through a multiple connector 180, which passes through a fixed wall 182 of the leakproof cavity 120 beneath a lug 184 formed on the fixed wall 182.

When the pressing iron 10 is rested upon a horizontal surface, the plastic material of the detachable wall 122 provides thermal insulation, which is ample even if other parts of the pressing iron 10 are quite hot. Because the triac 92 is contained in the leakproof cavity 110, the triac 92 is protected from corrosive action of water used for production of steam.

Advantageously, replacement of the triac 92 is an easy task, for which the detachable wall 122 must be detached, the cooling plate 98 must be removed from the metal plate 132, and the connectors 136 must be pulled open, but for which there is no need for the upper shell 40 or the metal shroud 30 to be separated from the soleplate 12.

The pressing iron 10 is provided with an electric cord 144, which is adapted to be connected to a conventional (alternating-current) supply. The rearwardly extending portion 112 of the rear supporting structure 44 is shaped as a storage reel 146, about which the electric cord 144 can be wound for convenient storage of the electric cord 144 between the marginal portions 126 of the detachable wall 122 and outer marginal portions 148 of the fixed wall 138.

A circuit board 150, on which the electronic components 96 including the integrated circuit 100 are mounted, is mounted within the leakproof cavity 120, which is bounded partially by a detachable cover 152. An aperture (not shown) in the upper shell 40 is opened, when the detachable cover 152 is detached, so as to expose the electronic components 96 and the circuit board 150 within the leakproof cavity 120. The detachable cover 152 has a tapered edge 158, which conforms to an undercut margin on the upper shell 40, so as to provide a labyrinthine seal between the detachable cover 152 and the upper shell 40.

An adjustable potentiometer 160, which is included among the electronic components 96, is mounted on the circuit board 150. An adjusting shaft 164 of the adjustable potentiometer 160 extends upwardly, through an aperture 166 in an upper wall 168 of the upper shell 40, and carries an adjusting knob 170, which rotates conjointly with the adjusting shaft 164 in an aperture 172 in the detachable cover 152. As shown in FIG. 1, an exemplary light-emitting diode 320, which exemplifies three separate light-emitting diodes included among the electronic components 96 and discussed hereinafter, is mounted on the circuit board 150 so as to be visible through a lens 190, which is mounted in an aperture 192 in the upper wall 168.

Figure 3:
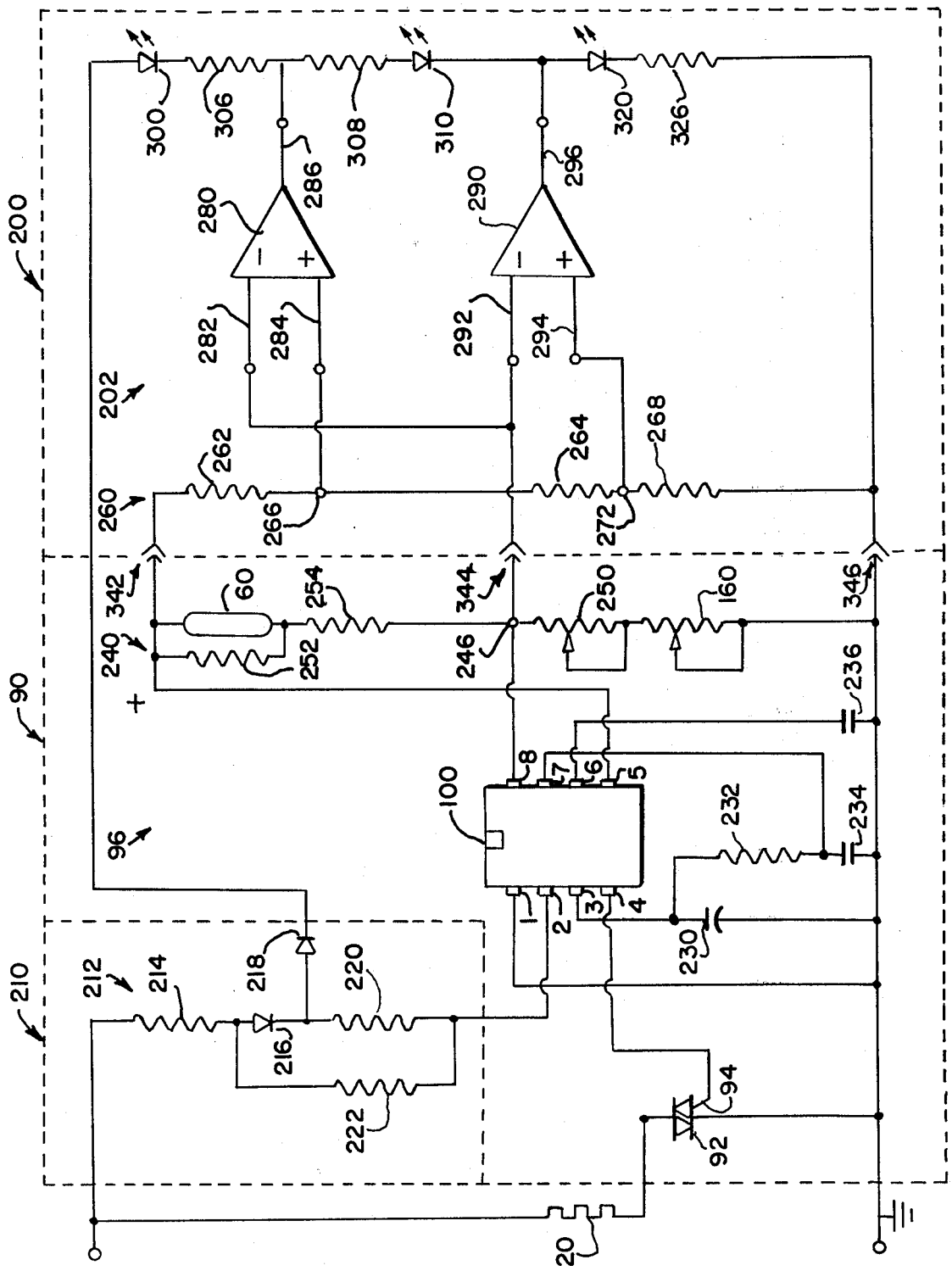
FIG. 3 is a diagram of electrical circuits of the pressing iron of FIG. 1.

The integrated circuit 100, which has respective pins numbered 1 through 8, is available commercially from Plessey Semiconductors Limited, Cheney Manor, Swindon, Wiltshire, SN2 2QW, U.K., as Plessey Semiconductors SL441A Zero Voltage Switch, which is described in Plessey Semiconductors Publication No. P.S. 1674, March 1979, wherein pin connections (in FIG. 1 of Publication No. P.S. 1674, March 1979) correspond to pin connections in FIG. 3 hereof. Equivalent integrated circuits may be available from other suppliers.

As shown in FIG. 3, the pressing iron 10 includes an indicating means 200, which is arranged to indicate whether the soleplate 12 has been heated to a desired temperature, and which comprises certain electronic components 202 tending to be affected adversely by heat. Also, the pressing iron 10 includes a voltage supply 210, which supplies positive rectified voltage to the indicating means 200, which supplies an alternating voltage to the electronic control 90, and which comprises certain electronic components 212 tending to be affected adversely by heat. The electronic components 202 and the electronic components 212 are mounted on the circuit board 150, within the leakproof cavity 120, and together with the electronic components 96.

The voltage supply 210 comprises a resistor 214, which is connected (through the electric cord 144) to the aforesaid (alternating-current) supply, a rectifying diode 216, which has its input connected to the resistor 214, and a blocking diode 218, which has its input connected to the output of the rectifying diode 216 at a junction, a resistor 220, which is connected between the junction (of the input of the blocking diode 218 and the output of the rectifying diode 216) and pin 2 of the integrated circuit 100, and a resistor 222, which shunts the rectifying diode 216 and the resistor 218. Thus, positive excursions traverse the resistor 220 and the resistor 222 in parallel, whereas negative excursions of current traverse the resistor 222 but not the resistor 220 because of the rectifying diode 216, whereupon the incoming voltage to pin 2 of the integrated circuit 100 has positive excursions of greater amplitude and negative excursions of lesser amplitude. The blocking diode 218 would prevent negative excursions through the resistor 220 and the resistor 222, if light-emitting diodes used in the indicating means 200 were to be replaced by bidirectional signalling means.

A smoothing capacitor 230, which may be electrolytic, is connected to pin 3 of the integrated circuit 100, so as to filter the alternating voltage from the voltage supply 210, and is grounded. A resistor 232 connects pin 3 of the integrated circuit 100 to pin 7 of the integrated circuit 100. A capacitor 234 is connected to pin 7 of the integrated circuit 100 and is grounded. A capacitor 236 is connected to pin 6 of the integrated circuit 100 and is grounded. As described hereinafter, a control voltage depending upon the temperature sensed by the sensor 60 is applied to pin 8 of the integrated circuit 100. The gate 94 of the triac 92 is connected to pin 4 of the integrated circuit 100. The resistor 232 and the capacitor 234 constitute a timing circuit, which cooperates with the integrated circuit 100 to initiate successive triggering pulses to the gate 94 of the triac 92. The capacitor 236 cooperates with the integrated circuit 100 to control the duration of each triggering pulse. Pin 5 of the integrated circuit 100 supplies a regulated output of constant (direct-current) voltage. Pin 1 of the integrated circuit 100 is grounded.

The electronic control 90 comprises a voltage divider 240, which includes one leg comprising the sensor 60 and another leg comprising the adjustable potentiometer 160, and which has a common tap 246. Preferably, the sensor 60 is a thermistor having a positive temperature coefficient of resistance, whereupon the legs of the voltage divider 240 are connected so as to connect the sensor 60 between pin 5 of the integrated circuit 100 and the common tap 246, as shown. Alternatively, the sensor 60 may be a thermistor having a negative temperature coefficient of resistance, whereupon the legs of the voltage divider 240 are interchanged.

The leg comprising the adjustable potentiometer 160 also comprises a settable trimmer 250 in series with the adjustable potentiometer 160. The adjustable potentiometer 160, which functions as a temperature preselector, may be one of a type that is adjustable continuously over a range or one of a type that is adjustable stepwise over a range. A step switch having step resistances may be used as the adjustable potentiometer 160. The leg comprising the sensor 60 also comprises a resistor 252, which is connected in parallel with the sensor 60, so as to reduce effects of nonlinearity of response of the sensor 60. The leg comprising the sensor 60 also comprises a resistor 254, which connects the sensor 60 and the resistor 252 to the common tap 246. The settable trimmer 250 and the resistor 254 enable the resistances of the legs of the voltage divider 240 to be equalized.

The voltage divider 240 is arranged so that the resistance of the adjustable potentiometer 160 for a preselected temperature setting corresponds to the resistance of the parallel combinations of the sensor 60 and the resistor 252 at the preselected temperature. If the adjustable potentiometer 160 is set, for a preselected temperature setting, to a resistance greater or less than the resistance of the parallel combination of the sensor 60 and the resistor 252, the control voltage at the common tap 246 falls or rises accordingly. The control voltage is applied, via pin 8, to the integrated circuit 100, which controls conduction of the triac 92 accordingly, whereupon the soleplate temperature sensed by the sensor 60 changes until the resistance of the parallel combination of the sensor 60 and the resistor 252 corresponds to the resistance of the adjustable potentiometer 160 so that the resistances of the legs of the voltage divider 240 are equalized, and so that the soleplate temperature sensed by the sensor 60 coincides with the preselected temperature setting.

Equivalently, a thermocouple may be used as the sensor 60, so as to effect an additive or subtractive change in the control voltage at the common tap 246 upon sensed changes in the soleplate temperature.

The indicating means 200 comprises a voltage divider 260, which includes a resistor 262 connected to pin 5 of the integrated circuit 100, a resistor 264 connected to the resistor 262 at a first tap 266, and a resistor 268 connected to the resistor 264 at a second tap 272 and grounded. Thus, the voltage divider 240 and the voltage divider 260 are connected in parallel to one source of constant voltage, which is supplied by pin 5 of the integrated circuit 100.

The indicating means 200 comprises a first operational amplifier 280, which is used as a comparator, and which has an inverting (−) input 282 used as a control input, a non-inverting (+) input 284 used as a reference input, and an output 286, and a second operational amplifier 290, which is used as a comparator, and which has an inverting (−) input 292 used as a control input, a non-inverting (+) input 294 used as a reference input, and an output 296. The inverting input 282 of the first operational amplifier 280 and the inverting input 292 of the second operational amplifier 290 are connected to the common tap 246 of the voltage divider 240 so that the control voltage at the common tap 246 is applied to the inverting input 282 and the inverting input 292. The first tap 266 of the voltage divider 260 is connected to the non-inverting input 284 of the first operational amplifier 280. The second tap 272 of the voltage divider 260 is connected to the non-inverting input 294 of the second operational amplifier 290.

The indicating means 200 comprises a first light-emitting diode 300, the input of which is connected to the output of the blocking diode 218, a resistor 306, which is connected between the output of the first light-emitting diode 300 and the output 286 of the first operational amplifier 280, a resistor 308, which is connected to the resistor 306 and the output of the first light-emitting diode 300, a second light-emitting diode 310, the input of which is connected to the resistor 308 so as to be connected to the output 286 of the first operational amplifier 280 through the resistor 308, a third light-emitting diode 320, the input of which is connected to the output of the second light-emitting diode 310 and the output 296 of the second operational amplifier 290, and a resistor 326, which is connected to the output of the third light-emitting diode 320, and which grounds the third light-emitting diode 320.

The first light-emitting diode 300 is selected for emission of yellow light. The second light-emitting diode 310 is selected for emission of green light. The third light-emitting diode 320 is selected for emission of red light.

If the control voltage at the common tap 246 is more than the reference voltage at the second tap 272 but less than the reference voltage at the first tap 266, the output 286 of the first operational amplifier 280 has positive saturated voltage and the output 296 of the second operational amplifier 290 has negative saturated voltage, whereupon current flows through the second light-emitting diode 310, which thus emits green light indicating that the temperature sensed by the sensor 60 is sufficient but not excessive for the pressing iron 10 to be used. Current does not flow through the first light-emitting diode 300 or the third light-emitting diode 320.

If the control voltage at the common tap 246 is less than the reference voltage at the second tap 272, the output 286 of the first operational amplifier 280 has positive saturated voltage and the output 296 of the second operational amplifier 290 has positive saturated voltage, whereupon current flows through the third light-emitting diode 320, which emits red light indicating that the temperature sensed by the sensor 60 is excessive for the pressing iron 10 to be used. Current does not flow through the first light-emitting diode 300 or the second light-emitting diode 310.

If the control voltage at the common tap 246 is more than the reference voltage at the first tap 266, the output 286 of the first operational amplifier 280 has negative saturated voltage and the output 296 of the second operational amplifier 290 has negative saturated voltage, whereupon current flows through the first light-emitting diode 300, which emits yellow light indicating that the temperature sensed by the sensor 60 is insufficient for the pressing iron 10 to be used. Current does not flow through the second light-emitting diode 310 or the third light-emitting diode 320.

As shown in FIG. 3, the indicating means 200 is connected to the electronic control 90 by a connector 342, which connects the high-voltage end of the voltage divider 260 to the high-voltage end of the voltage divider 240, a connector 344, which connects the inverting input 282 of the first operational amplifier 280 and the inverting imput 292 of the second operational amplifier 290 to the common tap 246 of the voltage divider 240, and a connector 346, which connects the low-voltage (grounded) end of the voltage divider 260 to the low-voltage (grounded) end of the voltage divider 240. The resistor 326 also is connected to the connector 346.

Figure 5:
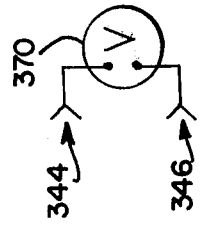

The indicating means 200, which is a digital device, may be replaced by an analog device comprising a voltmeter 360, which is connected to the electronic control 90 by the connector 342 and the connector 344, as shown in FIG. 4, or by a voltmeter 370, which is connected to the electronic control 90 by the connector 344 and the connector 346, as shown in FIG. 5. Alternatively, the light-emitting diodes of the indicating means 200 may be replaced by other types of optical signalling devices, or by acoustical signalling devices.

We claim:

1. In a pressing iron comprising a soleplate, an electric heater arranged to heat the soleplate when the electric heater is energized, a supporting structure mounted to the soleplate, a handle supported by the supporting structure and spaced from the soleplate and the electric heater, an electronic temperature control including a temperature sensor responsive to the temperature of the soleplate, a thyristor controlling energization of the electric heater and tending to emit heat, other electronic components tending to be affected adversely by heat, and a cooling plate mounted to the thyristor so as to dissipate heat from the thyristor, the supporting structure having a cavity containing the thyristor and the cooling plate, and the electronic components tending to be affected adversely by heat being located in the supporting structure but outside the cavity at a location remote therefrom, so as to be remote from the thyristor and the cooling plate, as well as from the soleplate and the electric heater, an improvement wherein the cooling plate is mounted to a detachable wall of the supporting structure, wherein the detachable wall is detachable for replacement of the thyristor without separation of other parts of the supporting structure from the soleplate, and wherein the detachable wall is shaped so as to provide a resting stand, which allows the pressing iron to be rested flatly upon a horizontal surface without contact between the soleplate and the horizontal surface.

2. The improvement of claim 1 wherein the detachable wall is shaped so as to close the cavity, which is leakproof when closed by the detachable wall, and wherein a metal plate, which is larger than the cooling plate, is mounted between the cooling plate and the detachable wall in heat exchange relationship with the cooling plate so as to dissipate heat from the cooling plate, and so as to reduce risk of scorching of the horizontal surface by heat emitted from the thyristor to the detachable wall.

3. The improvement of claim 2 wherein the detachable wall has an outer surface, on which the pressing iron can be rested, and which is contoured so as to provide parallel cooling ribs.

4. The improvement of claim 2 wherein the detachable wall has an inner surface, which faces the leakproof cavity, and an outer surface, on which the pressing iron can be rested, and which is larger than the inner surface.

5. The improvement of claim 4 wherein the outer surface is contoured so as to provide parallel cooling ribs.

6. The improvement of any one of claims 1 through 5 wherein the cavity is enclosed by a fixed wall of the supporting structure, a rearwardly extending portion of the supporting structure, and the detachable wall, and wherein the rearwardly extending portion of the supporting structure is shaped so as to provide a storage reel, about which an electric cord for the iron can be wound between outer marginal portions of the detachable wall and outer marginal portions of the fixed wall, and within which the leakproof cavity is located.

* * * * *